United States Patent [19]

Thompson et al.

[11] 4,007,500
[45] Feb. 15, 1977

[54] BATHTUB STOPPER

[75] Inventors: Arthur D. Thompson; Imao Kaibara, both of London, Canada

[73] Assignee: Emco Ltd., London, Canada

[22] Filed: May 27, 1976

[21] Appl. No.: 690,715

[52] U.S. Cl. .................................. 4/295; 137/315; 251/254
[51] Int. Cl.$^2$ ................ F16K 31/44; F16L 37/28; F16L 29/00
[58] Field of Search .................... 4/287, 295, 286; 137/315; 251/254, 227, 58, 251, 229

[56] References Cited
UNITED STATES PATENTS

| | | | |
|---|---|---|---|
| 1,155,576 | 10/1915 | Isley | 251/229 |
| 2,933,283 | 4/1960 | Kreis | 251/254 |
| 2,998,805 | 9/1961 | Usab | 251/58 |
| 3,052,258 | 9/1962 | Keller | 251/229 |
| 3,185,172 | 5/1965 | Hajek | 137/315 |
| 3,428,295 | 2/1969 | Downey et al. | 4/295 |
| 3,460,560 | 8/1969 | Kah et al. | 137/315 |
| 3,468,512 | 9/1969 | Politz | 4/295 |
| 3,698,418 | 10/1972 | Schmitt | 137/315 |
| 3,699,998 | 10/1972 | Baranowski | 137/315 |

*Primary Examiner*—Robert I. Smith
*Attorney, Agent, or Firm*—Fetherstonhaugh & Co.

[57] ABSTRACT

A bathtub stopper for closing the drain passage of a strainer cup of a bathtub according to the present invention consists of a main body portion which has first and second components adapted to telescope longitudinally with respect to one another between an extended position and a shortened position. The components are also rotatable with respect to one another about the longitudinal axis of the main body. The first component is manually engageable to be rotatably driven about the longitudinal axis and the second component is adapted to be secured to a strainer to locate the main body in an operative position with respect to the strainer. A closure means is carried by the first component for closing the drain passage when the main body is in the shortened position, the closure means being spaced from the strainer to open the drain passage when in the extended position. A continuous cam track means extends circumferentially of one of the components and includes crest and valley portions which are longitudinally and circumferentially spaced from one another. Cam follower means on the other of the components engages the cam track means whereby, upon rotation of one component with respect to the other, the cam follower means is guided along the cam track to locate the components in the shortened position when in engagement with the crest of the cam track and in an extended position when in engagement with a valley of the cam track.

6 Claims, 4 Drawing Figures

BATHTUB STOPPER

FIELD OF INVENTION

This invention relates to bathtub stoppers. In particular, this invention relates to a bathtub stopper which may be mounted in a strainer cup of a bathtub drain passage and which is rotatable in order to open and close the drainage passage.

PRIOR ART

Canadian Patent No. 965,903 describes a bathtub stopper of a type which is typical of the prior art. In this device, the stopper is opened or closed by pressing it downwardly. A latching mechanism is provided for retaining the stopper in the closed position. This mechanism is costly and subject to wear resulting from repeated use. In addition, because of the fact that the valve is opened and closed by the direct pushing action, it is possible for the valve to be accidentally opened or accidentally closed when the bathtub is in use.

An alternative closure member is described in Canadian Pat. No. 875,802. In this structure, the stopper is opened and closed by a combination of a push and turn action on the head of the stopper. In order to operate this mechanism, the user must have a clear indication of the sequence of the manipulations required in order to move the stopper. As the stopper is not always visible, difficulty can be experienced in attempting to open the valve.

The present invention overcomes the difficulties of the prior art described above and provides a simple bathtub stopper assembly which can be opened and closed by rotating the manually engageable portion thereof in either direction.

By reason of the fact that it is necessary to rotate the bathtub stopper of the present invention in order to open or close it, it is very unlikely that it could be accidentally opened or closed in use. In contrast, in the known bathtub stoppers which employ a pushbutton, it is possible to accidentally open or close the stopper in use. In addition, the structure of the preferred embodiment of the present invention does not include any springs which directly resist the rotation of the manually engageable member, with the result that only a very light touch is required in order to rotate the bathtub stopper from the open position to the closed position, and vice versa. This is in contrast to the conventional pushbutton mechanisms in which it is necessary to overcome the direct load applied to the latching mechanism by a compression spring or the like. In the applicant's structure, the cam assists the compression of the spring which normally serves to urge the assembly to the extended position.

A further feature of the stopper of the preferred embodiment is that it is possible to open or close it by rotation of the manually engageable member in either direction so that it is not necessary to provide extensive operating instructions with the device.

A still further feature of the preferred embodiment is that, by reason of the fact that an endless cam track is used to guide the cam follower between the opened and closed positions, the manual rotation of the stopper does not result in any two components being located in an abutting relationship which would permit the transfer of any significant torque from one to the other. As a consequence of this structure, it is possible to make the main body of the stopper member from a plastic material.

Another feature of the stopper of the preferred embodiment is that, in the action of opening and closing the stopper, the annular sealing member wipes against the sealing surface of the strainer and serves to keep the sealing surface clean so that a proper seal is provided between the sealing ring and the sealing surface when the stopper is in the closed position.

SUMMARY OF INVENTION

According to one aspect of the present invention, there is provided a bathtub stopper for closing the drain passage of a strainer cup of a bathtub which consists of a main body which, in turn, consists of two components. The two components are adapted to telescope longitudinally with respect to one another between an extended position and a shortened position. The components are rotatable with respect to one another about a longitudinal axis of the main body. The first of the components is manually engageable to be rotatably driven about the longitudinal axis and the second component is adapted to be secured to a strainer to locate the main body in an operative position with respect to the strainer. A closure member is carried by the first component for closing the drain passage when the main body is in its shortened position, the closure member being spaced from the strainer to open the drain passage when in the extended position. A continuous cam track extends circumferentially about one of the components, the cam track including crest and valley positions which are longitudinally and circumferentially spaced from one another. Cam follower means is provided on the other of the components and is adapted to engage the cam track such that upon rotation of one component with respect to the other, the cam follower is guided along the cam track to locate the components in the shortened position when in engagement with a crest of said track and in said extended position when in engagement with a valley of said cam track.

PREFERRED EMBODIMENT

The invention will be more clearly understood after reference to the following detailed specification read in conjunction with the drawings wherein.

Figure 1:
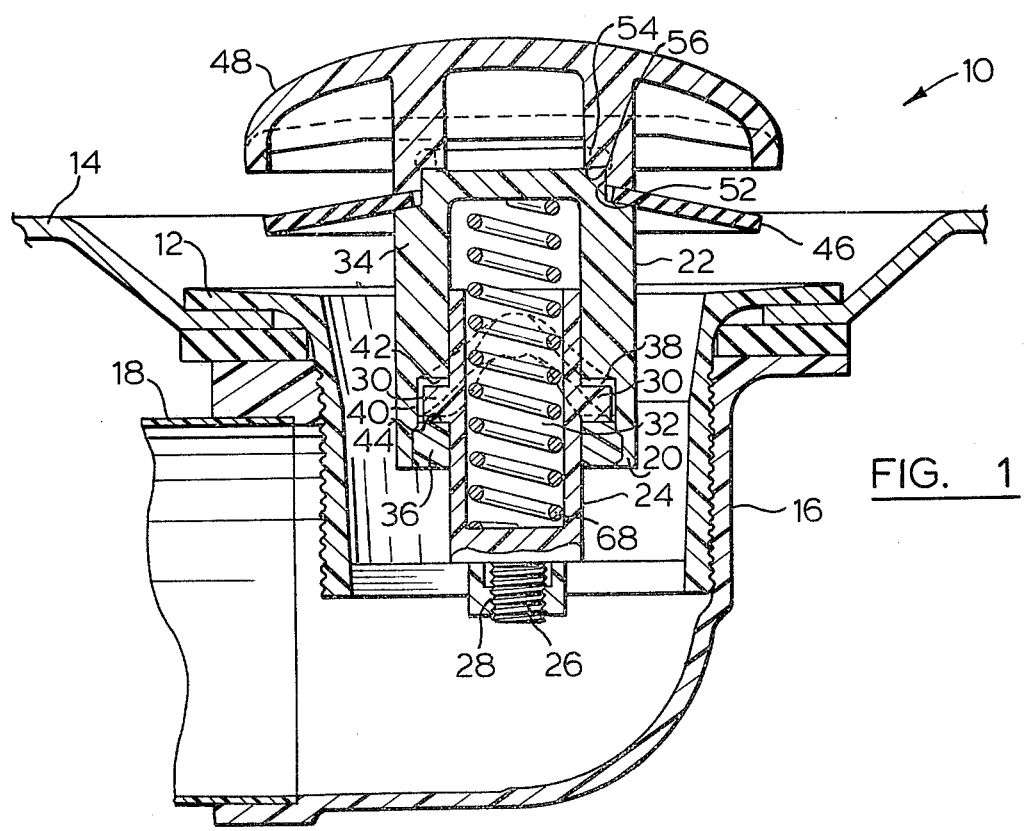
FIG. 1 is a sectional view of a bathtub drain passage with a bathtub stopper of the present invention in an open position.

With reference to FIG. 1 of the drawings, the reference numeral 10 refers generally to a bathtub stopped according to an embodiment of the present invention. The stopper 10 is mounted in a strainer cup 12 which, in turn, is mounted in the drain passage of a bathtub 14 and connected to the drain pipe 18 by means of an elbow 16.

The stopper assembly 10 has a main body portion 20 which consists of a first component 22 and a second component 24.

The second component 24 has a short threaded shaft 26 at the lower end which is adapted to be threadably mounted in an opening 28 at the lower end of the strainer 12 so as to support the stopper assembly in an operative position with respect to the strainer 12. The second component 24 has a tubular body portion projecting upwardly from the shaft 26 and has a pair of short circular cam follower lugs 30 projecting outwardly from diametrically opposite sides thereof. The second component 24 also has a hollow passage 32 extending inwardly from the upper end thereof.

The first component 22 consists of an upper section 34 and a lower section 36. The lower section 36 is located in a passage 40 formed in the lower end of the upper section 34. A cam track, generally identified by the reference numeral 38, is formed between the upper cam track surface 42 formed on the upper portion 34 and the lower cam track surface 44 formed on the lower section 36. The cam follower lugs 30 project into the cam track 38.

Figure 2:
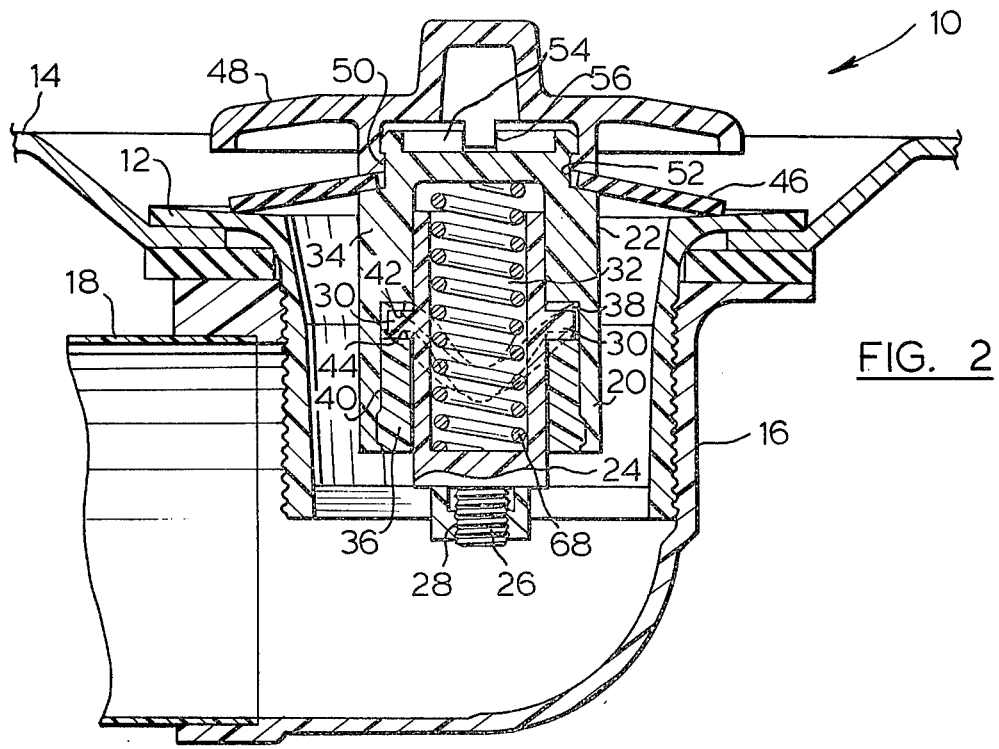
FIG. 2 is a view similar to FIG. 1 showing the stopper in a closed position.
Figure 3:
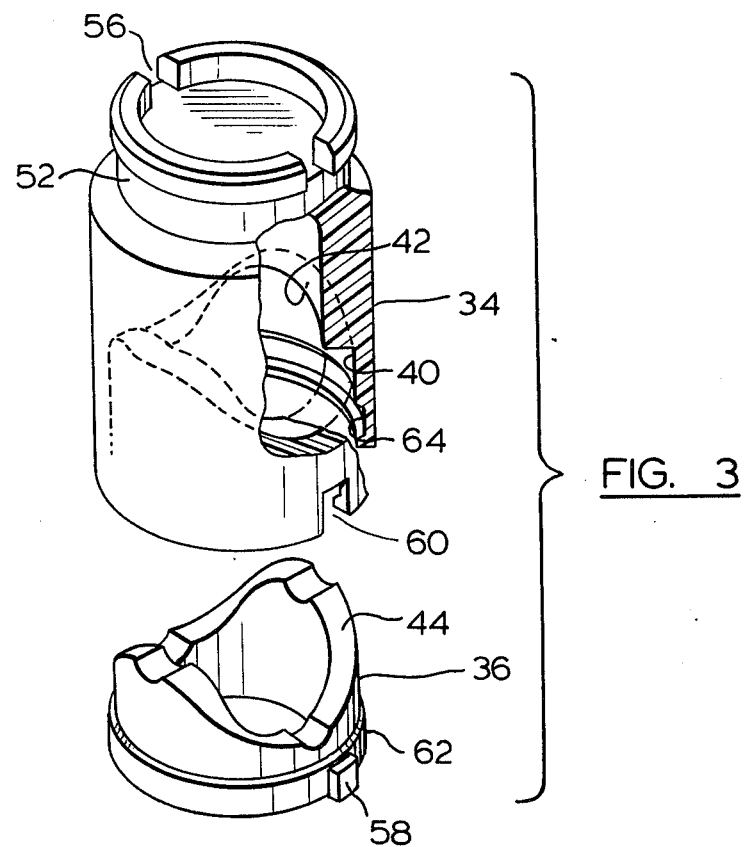
FIG. 3 is a partially sectioned exploded view of one component of the main body of the assembly.

A flexible sealing ring 46 is secured to the upper end of the first section 22 by means of a manually engageable cap 48. The cap 48 has an annular lip 50 (FIG. 2) which projects into an annular recess 52 in the upper portion 34. The annular lip 50 has interruptions in its circumferantial length which permit it to be sprung outwardly to pass over the end of the upper portion 34 to be located in the recess 52 during assembly. Detents 54 which form an integral part of the cap 48 project into corresponding recesses 56 in the upper end of the main body to provide a positive drive connection between the cap and the main body to ensure that the first component 22 may be rotatably driven by rotation of the cap. The lower section 36 is adapted to fit in a close fitting relationship within the bore 40 of the upper section with the cam track surface 44 aligned with the cam track surface 42. A pair of oppositely disposed detents 58, shown in FIG. 3, project outwardly from the lower end of the lower portion 36 and are adapted to fit in a close fitting relationship within slots 60, shown in FIG. 3, in the lower end of the upper portion 34. The lower portion 36 also has a narrow radially extending collar 62 adapted to fit within a corresponding recess 64 and the lower end of the upper portion 34 so that the lower portion 36 is locked within the upper portion 34 in use.

A compression spring 68 is adapted to fit within the hollow passage 32 of the second component 24 to bear against the first and second components of the main body and serves to urge the main body towards the extended position shown in FIG. 1 of the drawings.

Figure 4:
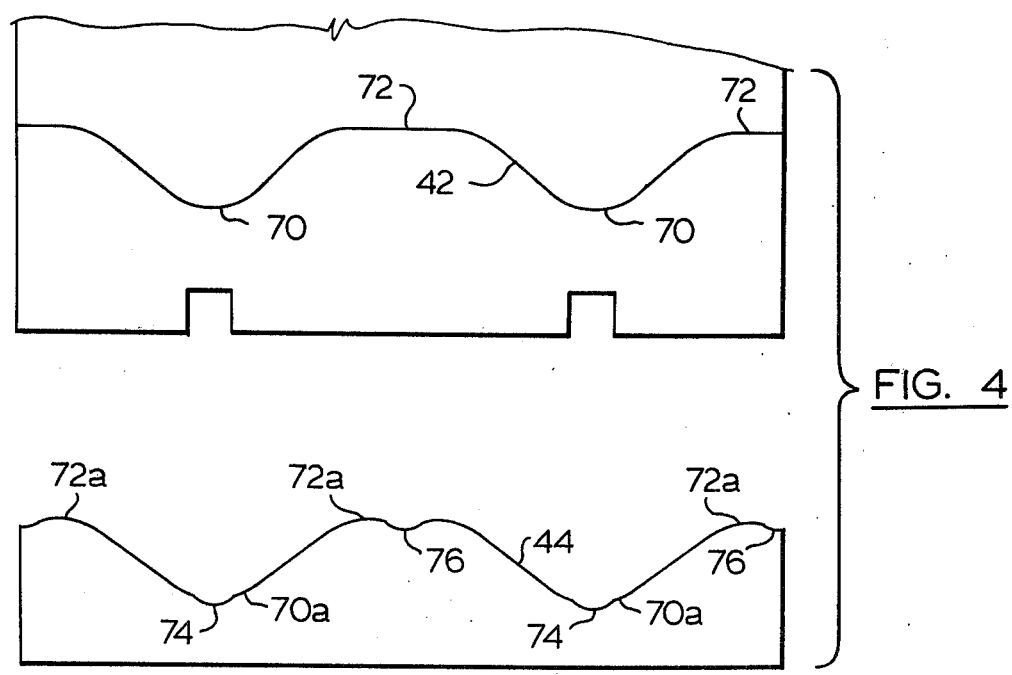
FIG. 4 is a developed cam detail of the components of FIG. 3.

As shown in FIG. 4 of the drawings, the upper cam track surface 42 has two downwardly directed crests 70 and two upwardly directed valleys 72. The lower cam track surface 44 has two valleys 70a and two crests 72a. The lower cam track surface 44 has shallow recesses 74 in the base of each valley 70a and shallow recesses 76 at each crest 72a.

As previously indicated when the stopper is located in the open position, shown in FIG. 1, the seal 46 is spaced from the edge of the strainer 12 so that the water may drain from the tub to the drain pipe 18. To close the stopper, the cap 48 is manually engaged and may be rotated in either direction. Rotation of the cap 48 causes rotation of the first component 22 of the main body with respect to the second component 24. The cam follower lugs 30 which bear on the cam track surface 44 cause the main body to telescope and shorten until the cam follower lugs are located at the crests of the cam track surface 44. When the cam follower lugs 30 are in this position, the seal 46 bears against the lip of the strainer 12 and closes the drain passage. The shallow recess 76 formed at the crest 72a of the cam track surface 44 serves to retain the stopper in a closed position. To open the stopper, the cap 48 may be rotated in either direction. As the cam follower lugs 30 move away from the crest 72a of the lower cam track surface 44, they move toward the valley 70a of the cam track surface 44. The compression spring 68 serves to move the cap upwardly to raise the seal 46 upwardly away from the strainer 12 to open the drain passage. As previously indicated, a shallow recess 74 is formed at the base of each of the valleys 70a of the lower cam track surface 44. In order to threadably mount the stopper within the strainer, the threaded shaft 26 is initially rotated into the threaded opening 28. As the shaft 26 begins to tighten into the opening 28, the mechanic applies an upward force to the cap by grasping the bottom edge of the cap which increases the loading between cam follower lugs 30 and recesses 74 or 76 so that an increased torque may be applied to the second component to firmly secure the second component within the strainer.

By reason of the fact that the cam track 38 extends in a continuous path about the interior of the first component, the stopper may be rotated in either direction without any substantial force being transmitted by the act of rotation to the mounting screw. The only resistance to rotation of the first component is the resistance offered by the compression spring and the frictional engagement of the cam follower lugs and cam track. For this reason, the stopper is subject to minimum wear. In addition, the structure of the stopper is such that it may be assembled with ease and the main body and cap may be constructed entirely from components manufactured from plastics material.

A further advantage of the structure of the stopper of the present invention is that by reason of the fact that opening and closing is effected by rotation of the stopper, it is not likely that the stopper can be accidentally moved from the open position to the closed position or vice versa.

One of the main reasons why prior bathtub stoppers have not been made from plastics material is that, in the mounting of the stopper assembly to the strainer and in its operation, there has been a tendency to apply excessive loads to the threaded connection serving to strip the threads. In a pushbutton type of mechanism, this difficulty has existed because it is possible to apply a very substantial torque to the component which is threaded in the strainer. In the structure of the stopper of the present invention, any attempt to apply an excessive torque to the component which is secured to the strainer would merely result in the rotation of one component with respect to the other component of the main body by reason of the fact that the cam track 38 is continuous and the small recesses 74 and 76 are not sufficiently deep to provide a solid abutment against which the followers 30 may react. The ability to manufacture the main body and cap from a plastics material considerably reduces the cost of production as it eliminates the machining operations required in the manufacture of the conventional metal stopper assemblies.

From the foregoing description of the invention, it will be apparent that as the flexible sealing member 46 approaches the lip of the strainer, it is being rotated and, consequently, it will tend to wipe the surface of the flange clean of obstructions to provide an efficient seal when the cap is in the lowered position.

These and other advantages of the bathtub stopper of the present invention will be apparent to those skilled in the art.

What I claim as my invention is:

1. A bathtub stopper for closing the drain passage of a strainer cup of a bathtub comprising:
   a. a main body consisting of first and second components adapted to telescope longitudinally with respect to one another between an extended position and a shortened position, said components also being rotatable with respect to one another about a longitudinal axis of said main body, said first component being manually engageable to be rotatably driven about said longitudinal axis, said second component being adapted to be secured to a strainer to locate said main body in an operative position with respect to a strainer,
   b. closure means carried by said first component for closing said drain passage when said main body is in said shortened position, said closure means being spaced from said strainer to open said drain passage when in said extended position,
   c. continuous cam track means extending circumferentially of one of said components, said cam track means including crest and valley positions which are longitudinally and circumferentially spaced from one another,
   d. cam follower means on the other of said components engaging said cam track whereby upon rotation of one component with respect to the other, the cam follower is guided along the cam track to locate said components in said shortened position when in engagement with a crest of said cam track and in said extended position when in engagement with a valley of said cam track.

2. A bathtub stopper as claimed in claim 1, including first recess means in said cam track for engagement with said cam follower means to releasably interlock said first and second components whereby said main body may be rotated as a unit to be mounted in said strainer cup.

3. A bathtub stopper as claimed in claim 1, including second recess means in said cam track to releasably lock said components in said shortened position.

4. A bathtub stopper as claimed in claim 2, including second recess means in said cam track to releasably lock said components in said shortened position.

5. A bathtub stopper as claimed in claim 1, wherein said cam track has two crests arranged diametrically opposite one another and two valleys arranged diametrically opposite one another, and said cam follower means includes two cam followers arranged diametrically opposite one another.

6. A bathtub stopper as claimed in claim 5, wherein said crests and valleys of said cam track are circumferentially spaced 90° from one another.

* * * * *